United States Patent
Campbell et al.

(10) Patent No.: US 11,441,052 B2
(45) Date of Patent: Sep. 13, 2022

(54) PROCESS FOR COATING FIBER COMPOSITE PANELS AT LOW BAKING TEMPERATURES

(71) Applicant: BASF Coatings GmbH, Münster (DE)

(72) Inventors: Donald H Campbell, Southfield, MI (US); Colin Wade, Southfield, MI (US)

(73) Assignee: BASF Coatings GmbH, Münster (DE)

( * ) Notice: Subject to any disclaimer, the term of this patent is extended or adjusted under 35 U.S.C. 154(b) by 0 days.

(21) Appl. No.: 16/962,435

(22) PCT Filed: Jan. 18, 2019

(86) PCT No.: PCT/EP2019/051284
§ 371 (c)(1),
(2) Date: Jul. 15, 2020

(87) PCT Pub. No.: WO2019/141823
PCT Pub. Date: Jul. 25, 2019

(65) Prior Publication Data
US 2021/0062037 A1  Mar. 4, 2021

(30) Foreign Application Priority Data

Jan. 18, 2018 (EP) .................... 18152318

(51) Int. Cl.
*B05D 7/00* (2006.01)
*C09D 175/14* (2006.01)

(52) U.S. Cl.
CPC ........... *C09D 175/14* (2013.01); *B05D 7/576* (2013.01)

(58) Field of Classification Search
None
See application file for complete search history.

(56) References Cited

U.S. PATENT DOCUMENTS

| | | | |
|---|---|---|---|
| 2005/0079293 A1* | 4/2005 | Baumgart | B05D 7/16 427/553 |
| 2006/0263529 A1 | 11/2006 | Lustiger et al. | |
| 2007/0104874 A1* | 5/2007 | Ogawa | B05D 5/068 427/372.2 |
| 2014/0072442 A1* | 3/2014 | Bowman | C08K 3/22 416/241 R |

FOREIGN PATENT DOCUMENTS

EP  1152897 B1  3/2005

OTHER PUBLICATIONS

International Search Report and Written opinion for corresponding PCT/EP2019/051284 dated Apr. 17, 2019, 8 pages.

\* cited by examiner

*Primary Examiner* — Shamim Ahmed
*Assistant Examiner* — Bradford M Gates
(74) *Attorney, Agent, or Firm* — Armstrong Teasdale LLP

(57) ABSTRACT

Described herein is a process for producing a multilayer coating onto a fiber-reinforced composite material. Also described herein is a fiber-reinforced composite material coated with a multilayer coating obtainable by this process.

20 Claims, No Drawings

PROCESS FOR COATING FIBER COMPOSITE PANELS AT LOW BAKING TEMPERATURES

CROSS-REFERENCE TO RELATED APPLICATIONS

This application is a U.S. National Phase Application of PCT/EP2019/051284, filed Jan. 18, 2019, which claims the benefit of priority to European Patent Application 18152318.4, filed Jan. 18, 2018, the entire contents of which are hereby incorporated by reference herein.

The present invention relates to a process for producing a multilayer coating onto a fiber-reinforced composite material with the aim to achieve an excellent surface appearance and good adhesion. The invention further relates to a fiber-reinforced composite material coated with a multilayer coating, the thus coated fiber-reinforced composite material being obtainable in such process.

Fiber composite panels, especially those using carbon fiber, find utility where light weight and strength are required. These include sporting goods, wind energy and increasing interest in lightweight automotive engineering for reduced emissions and energy consumption. For such composite materials to be employed as exterior body panels they must be capable to achieve a Class A surface appearance after topcoating.

However, achieving a Class A surface is difficult because automotive topcoats must be baked at 80 to 140° C. to achieve the necessary adhesion and durability properties required for service. As the topcoated composite panels are cooled after baking, differences in the coefficient of thermal expansion between the resin and the fiber (e.g. carbon or glass) and the resin matrix (e.g. epoxy, polyamide, polypropylene etc.) cause the surface topography of the substrate to distort from its position at the baking temperature. These changes, in turn, result in distortion of the topcoat surface and the loss of appearance. These changes can be mapped to the distribution of the fibers within the substrate. These phenomena are described in Polymer Composites August 2000, pp. 630-635 by Neitzel et al. in the article "Surface quality characterization of textile-reinforced thermoplastics".

In some cases, polymer fibers such as polyester or polyamide have been used in place of the low CTE glass or carbon (US 2006/0263529 A1). However, these organic fibers do not provide the necessary increase in flexural modulus required for lightweighting.

This change in surface topography can be reduced by applying a 150 to 200 micron thick layer of polymer onto the composite surface by any of several means.

In some cases, for example in WO 2009/147633 A1, where the composite is laid into a mold (autoclave or compression molding), it is possible to lay down a resinous "veil" onto the Class A side before closing the mold. However, in cases where this surface has complex features this layer can be distorted and penetrated during compression. Furthermore, such a technique cannot be applied to injection molded parts such as is used with thermoplastic polymers or in resin transfer molding (RTM).

Others have applied this layer after molding of the part by backfill molding applications (Plastics Today, Internet Newsletter, Oct. 16, 2013). If the panel is flat, then the mold face can be backed away 200 microns and a second resin of the same or different type can be injected and cured. However, if the panel has complex features, then a second mold is required that is 200 microns larger in all dimensions to achieve a uniform thickness. This second mold increases the capital costs.

Alternatively, thick laminate films can be applied after molding is complete as described in EP2643394 A1. Wrinkling of the film can occur during application and the film must be trimmed at the edges adding yet another step and adding waste to the process.

In addition, all the before mentioned extra processes only prepare the substrate to be topcoated with the proper color coat and clearcoat. Current coating processes for unimproved fiber composite substrates involve multiple coats where labor intensive sanding is performed between coats. However, with successive coats, a sufficient layer thickness can be achieved. In these cases, the addition of 200 microns of additional thickness can represent a 10 to 20% increase in the part thickness. This is counterproductive to the lightweighting goal.

Therefore, there remains a need to provide a topcoat composition and process that provides a class A surface appearance without the need for thick films or sanding processes. Furthermore, this topcoat must be able to meet all the adhesion and durability requirements of automotive coatings.

One means to reduce or eliminate this effect is to reduce the baking temperature of the topcoat system. Baking is required to drive the crosslinking reactions that build the molecular weight of the coating prepolymers and eventually provide a crosslinked network with good adhesion and cohesion even when swollen with water or organic materials. To achieve the required productivity, this curing must occur within 30 to 40 minutes after coating application.

In the industry, it is common to use two-pack clearcoats. Here the reactivity of the crosslinking chemistry can be made to be quite fast so that crosslinking can be achieved in less than an hour at relatively low temperatures. However, for the colorcoat or basecoat layer, two-pack systems are uncommon due to the complexity that results when 10 to 30 colors must be metered and mixed precisely. These one-pack basecoats must be stable to reactivity for several months for adequate inventory and supply chain management. Because of their lower reactivity, such coatings require a minimum of 80° C. for curing.

In addition, for some plastics such a polypropylene it is required that the substrate reaches a certain softening temperature for the polymers in the primer layer to achieve adequate adhesion without flame treatment. This softening also requires 80 to 90° C. The change in surface topography of these fiber reinforced substrates as they cool from 80° C. to room temperature is sufficient to ruin the appearance of the topcoat.

Furthermore, it is not uncommon for automotive body panels to reach 80° C. during service for dark colors in hot sunny environments.

Thus, the problems to be solved by the present invention are to provide an effective process for producing a Class A multilayer coating on a fiber-reinforced composite material having an excellent appearance, durability, scratch and mar resistance and particularly exhibiting excellent leveling characteristics, while having an acceptable overall multilayer thickness, to provide a lightweight layer composition. In the process, there should be no need of mechanical roughening of surfaces of the interlayers of the multilayer coating as for example sanding and the like to achieve a good interlayer adhesion. Furthermore, the time frame to obtain the cured multilayer coating should be short enough to allow short processing times.

It was surprisingly found that the aims of the present invention were achieved by providing a process for producing a multilayer coating onto a fiber-reinforced composite material, comprising the steps of i. applying a primer compositions onto the fiber-reinforced composite material to form a primer layer and at least partially drying the primer layer,
ii. applying a basecoat composition onto the primer layer to form a basecoat layer and at least partially drying the basecoat layer,
iii. (a) applying a first clearcoat composition 1 onto the basecoat layer to form a first clearcoat layer 1 and curing the layers formed in steps i., ii. and the first clearcoat layer at a temperature of at least 80° C. and subsequently applying a second clearcoat composition 2 onto the thus cured layers to form a clearcoat layer 2 and curing clearcoat layer 2 at a temperature of more than 25° C. to less than 60° C. for 10 to 40 min; or
 (b) directly applying the clearcoat composition 2 onto the basecoat layer to form a single clearcoat layer 2 and curing the single clearcoat layer 2 at a temperature of more than 25° C. to less than 60° C. for 10 to 40 min followed by curing the primer, basecoat and clearcoat layer 2 at a temperature of at least 80° C.

In the following the above process is referred to as process according to the invention or "process of the invention".

In step iii.(a) an additional clearcoat composition 1 is applied to the basecoat layer to form a first clearcoat layer 1 between the basecoat layer and the second clearcoat layer 2. In this case, primer layer, basecoat layer and first clearcoat layer 1 are cured at a temperature of at least 80° C., before clearcoat composition 2 is applied to from clearcoat layer 2.

In the alternative step iii.(b) no clearcoat composition 1 is applied and no clearcoat layer 1 is formed. Instead, the clearcoat composition 2 as used in step iii.(a) is directly applied to the basecoat layer to form a single clearcoat layer 2 as the only clearcoat layer. Finally, the thus produced multilayer composition is cured at a temperature of at least 80° C. to cure the yet uncured or incompletely cured layers.

In both alternatives clearcoat layer 2 is cured at a temperature of more than 25° C. to less than 60° C. for 10 to 40 min, which is the crucial step of the present invention, as will be shown in the experimental section of the present invention.

In step iii.(a) it is optional to cure the clear coat layer 2 in a second, subsequent curing step at a temperature of at least 80° C., since primer and basecoat layers are already cured. However, such second curing step is not detrimental to the appearance of multilayer coating.

DETAILED DESCRIPTION

The Fiber-Reinforced Composite Material

As explained above, differences in the coefficient of thermal expansion between the polymeric matrix of a fiber-reinforced composite material and the fibers contained therein cause the surface topography of the substrate to distort from its position at the position at the baking temperature, which in turn results in distortion of the topcoat surface and the loss of appearance, causing insufficient leveling at the surface. This effect is particularly pronounced, if the difference between the coefficient of thermal expansion of the polymeric matrix and the fibers is high. For such kind of fiber-reinforced composite material, the value of the process according to the invention best.

Therefore, in the process of the present invention, it is preferred to use a fiber-reinforced composite material comprising a polymeric material and inorganic fibers.

The polymeric matrix material is preferably selected from the group consisting of epoxy resins, polyamides, polyesters such as cured unsaturated polyester resins or polybutylene terephthalates, vinyl esters, polycarbonates, polyoxymethylenes and polypropylenes. Most preferred are epoxy resins, cured unsaturated polyester resins, polyamides and polypropylenes.

The fibers can be organic or inorganic fibers, inorganic fibers being preferred. Particularly preferred are carbon fibers and glass fiber, because they provide excellent mechanical properties to the composite material, while exhibiting a relatively low weight in relation to the mechanical properties obtained. However, the difference between the coefficient of thermal expansion of the polymeric matrix and such inorganic fibers is relatively high, making the process of the present invention particularly valuable for such combinations of polymeric matrix with inorganic fibers.

Particularly preferred are combinations of polyamides as polymeric matrix materials with glass fibers and/or carbon fibers, carbon fiber being even more preferred.

The fibers can be in the form of a prepreg formed from one or more layers of fibers or fiber composites. Particularly the fibers can be in any form as for example in form of webs, woven material such as fabrics and cloth or non-woven mats, chopped fibers, strands and the like.

Before performing the process according to the invention, it might be necessary to clean the surface of the fiber-reinforced composite material. Since fiber-reinforced composites are usually produced using molds, it is in many cases necessary to coat the mold with a mold release agent prior to the manufacture of the fiber-reinforced composite material. Since such mold release agents are known to interfere with the adhesion of the composite material to the primer coating material to be applied in many cases, cleaning of the fiber-reinforced composite, e.g. by wiping with a cleaning agent comprising moisturized cloth may be advisable.

Moreover, it is possible to use activated fiber-reinforced composite materials, activated for example by flame treatment, plasma treatment and/or corona treatment.

Primer Composition

One of the big advantages of the process according to the invention is that there is no need to select special primer coating compositions which must be applied in high layer thickness to provide good leveling characteristics to the topcoat, particularly low long and short wave values measured with a wave-scan apparatus.

Therefore, any conventional primer compositions can be used as known to the skilled person. There are many primer compositions available tailored to the specific chemical composition of the polymer matrix of the fiber-reinforced composite.

The primer compositions can be solvent-borne compositions or water-borne compositions. Furthermore, the primer compositions can be one-pack compositions as described in the next paragraph or two-pack compositions as defined further below.

The term "water-borne coating composition" denotes for a coating composition wherein more than 50% by weight of the volatile content of the coating composition is water, while the term "solvent-based coating composition" denotes for a coating composition wherein up to 50% by weight of the volatile content of the coating composition differs from water, preferably wherein up to 50% by weight of the volatile content of the coating composition are one or more organic solvents. The afore-mentioned definitions apply to all primer, basecoat and clearcoat compositions likewise. The volatile content can be determined by drying 1 g of a coating composition at 120° C. for 90 minutes. The weight loss equals the volatile content of the respective coating composition. The volatile content can be collected in a cold trap and analyzed by conventional methods known to one skilled in the art. Water content can e.g. be determined by Karl Fischer titration. In practice and preferably herein "solvent-borne coating compositions" contain, based on the total weight of the coating composition, less than 5% by weight of water, more preferably less than 3% by weight and most preferably less than 1% by weight of water. In practice and preferably herein "water-borne coating compositions" contain, based on the volatile content of the coating composition, less than 25% by weight of organic solvents, more preferably less than 20% by weight and most preferably less than 15% by weight of organic solvents.

Preferably solvent-borne primer compositions are used in the process according to the present invention. More preferred solvent-borne one-pack primer compositions.

A "one-pack coating composition"—as defined in the textbook "Römpp Lexikon Lacke and Druckfarben", Thieme, 1998—is a coating composition, which, contrary to the below described two-pack coating compositions are produced and supplied in a way that they contain the base resins and the curing agents in one composition without premature reaction between the ingredients. Reaction is preferably caused either by heating/baking or reaction with air moisture. This definition is valid for all one-pack coating compositions as described herein, irrespective of whether it is a primer composition, basecoat composition or clearcoat composition.

Using a one-pack solvent-borne primer composition has the advantage that usually no pre-treatment of the substrate is required. However, preferably adhesion promotors are contained in the compositions.

Using a two-pack water-borne primer composition has the advantage that high solvent evaporations is avoided. However, most often the substrate must be pre-treated by e.g. flame treatment, as described below. Using a two-pack water-borne primer composition is preferably accompanied by a curing step after the drying step. However, some partial curing can already occur during the drying step. A typical two-pack water-borne primer composition is commercially available under the name CombiBloc® from BASF Corporation, Coatings Division, 26701 Telegraph Rd. Southfield, Mich. 48033.

Typically, the solvents used in the primer composition are aliphatic and/or aromatic hydrocarbons such as toluene, xylene, solvent naphtha, Solvesso 100 or Hydrosol® (obtainable from ARAL), ketones, such as acetone, methyl ethyl ketone, methyl propyl ketone and/or methyl amyl ketone, esters, such as ethyl acetate, butyl acetate, pentyl acetate or ethyl 3-ethoxypropionate, ethers, or mixtures of the afore-mentioned solvents. Most preferred are aromatic hydrocarbons and ketones.

Preferably the base resins used in the primer compositions are polyesterpolyoles and/or poly(meth)acrylate polyols. The term "(meth)acrylate" as used throughout the specification, as for example in "poly(meth)acrylate", denotes for both "acrylate" as well as "methacrylate". Therefore a "poly(meth)acrylate" can contain acrylate monomers, methacrylate monomers or both, in polymerized form. However, a "poly(meth)acrylate" does not necessarily consist of the before-mentioned monomers, but can further contain non-(meth)acrylate monomers as for example vinylaromatic hydrocarbons etc.

Such solvent-borne one-pack basecoat compositions preferably contain as curing agents so-called aminoplast resins. Particularly preferred aminoplast resins are highly methoxymethylated melamine-formaldehyde resins such as hexamethoxymethyl melamine formaldehyde resins (HMMM).

The primer compositions as used in the process according to the present invention preferably comprise customary fillers and pigments.

Examples of suitable organic and inorganic fillers are chalk, calcium sulfates, barium sulfate, silicates such as talc, mica or kaolin, silicas, such as Aerosil® products (obtainable from Evonik), oxides, such as aluminum hydroxide or magnesium hydroxide, or organic fillers such as polymer powders, especially those of polyamide or polyacrylonitrile. Most preferred are inorganic fillers and particularly silicas.

Examples of suitable inorganic color pigments are white pigments such as titanium dioxide (e.g. Ti-Pure® products obtainable from The Chemour Company TT), zinc white, zinc sulfide or lithopone; black pigments such as carbon black, iron manganese black or spinel black; color pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate. Most preferred pigments are titanium dioxide and carbon black. Furthermore, the coating material of the invention may comprise other color pigments and/or electrically conductive or magnetically shielding pigments and/or soluble dyes.

Examples of suitable organic color pigments are azo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

Particularly suitable for use in the present primer compositions are electrically conductive pigments. The primer composition used according to the present invention therefore preferably contains electrically conductive carbon blacks such as Conductex® carbon blacks (as obtainable from Birla Carbon Specialty Blacks) and/or Printex® carbon blacks (as obtainable from The Cary Company).

Furthermore, the primer composition as used in the process of the invention may comprise additives.

Particularly suitable additives are adhesion promoters as e.g. chlorinated polyolefins grafted with maleic anhydride, such as Hardlen® products as obtainable from Toyobo); or catalysts promoting the reaction between the base resins and curing agents, such as toluene sulfonic acid and its amine salts.

Even though it is not necessary, it is possible to apply more than one primer composition to form more than one primer layer before applying the basecoat composition. However, it is preferred to apply only one primer composition to form one primer layer.

In the present invention, it is particularly preferred that the dry layer thickness of the primer layer is from 3 to 30 μm, more preferred 5 to 20 µm and most preferred 6 to 16 µm. The dry layer thickness of any coating layer in this specification being determined by coating a steel panel alongside of the composite substrate and measuring the thickness of each layer of on the steel panel using ASTM D1186-01 Method B, Standard Test Methods for nondestructive measurement of Dry Film Thickness of nonmagnetic coatings applied to a ferrous base. Multiple tape strips equal to the number of coating layers are applied to the steel panel before coating and pulled after each layer is sprayed. This allows the thickness of each layer to be determined individually.

Basecoat Composition

Water-borne and solvent-borne basecoat compositions can be used in the process of the present invention. Preference is given to water-borne basecoat compositions.

The basecoat compositions are preferably one-pack basecoat compositions.

The base resins in the preferred water-borne one-pack basecoat compositions are preferably water-soluble and/or water-dispersible polyurethane-based resins and water-soluble and/or water-dispersible polyester resins.

Such water-borne one-pack basecoat compositions preferably contain as base resins one or more polyurethane-based resins selected from the group consisting of polyurethanes, polyurethane-modified polyacrylates and acrylicized polyurethanes; polyurethanes, and polyurethane-modified polyacrylates being preferred. Such polyurethane-based resins are for example disclosed in U.S. Pat. No. 6,001,915, particularly in Examples B, C and D. Suitable polyester resins are also disclosed in U.S. Pat. No. 6,001,915, particularly in Example A.

Such water-borne one-pack basecoat compositions preferably contain as curing agents so-called aminoplast resins. Particularly preferred aminoplast resins are melamine resins such as alkylated melamine formaldehyde resins, preferably of the imino type.

The basecoat compositions typically comprise pigments such as the ones already described for the primer composition. The level of pigmentation is within the usual ranges and depends on the extent of hiding power and color strength of the pigments.

The basecoat composition typically contains suitable coatings additives such as UV absorbers, light stabilizers such as HALS compounds, benzotriazoles or oxalanilides; free-radical scavengers; slip additives; polymerization inhibitors; defoamers; wetting agents such as siloxanes, fluorine compounds, carboxylic monoesters, phosphoric esters, polyacrylic acids and their copolymers, or polyurethanes; dispersing agents, adhesion promoters such as tricyclodecanedimethanol; flow control agents; film-forming assistants such as cellulose derivatives; and in particular rheology control additives such as phyllosilicates, urethane and acrylic based thickeners; and/or flame retardants.

Suitable basecoat materials are described for example in U.S. Pat. No. 6,001,915. High solids basecoats are described in U.S. Pat. No. 5,360,644. Medium solids basecoats are described in: "Coating formulation: an international textbook" (Authors: Bodo Müller, Ulrich Poth; Vincenz Network GmbH & Co. KG, Hannover, 2006, (Coatings Compendia), pp. 139-140; ISBM 3-87870-177-2). the reference below on pages 139-140.

The applied basecoat composition is preferably first dried, i.e., at least some of the organic solvent and/or water is stripped from the basecoat film in an evaporation phase. Drying (i.e. flashing off) is accomplished preferably at temperatures from room temperature (i.e. 23° C.) to below 80° C., preferably up to 60° C. for 1 to 30 min, preferably 2 to 15 min and even more preferred 4 to 10 min.

Even though it is not necessary, it is possible to apply more than one basecoat composition to form more than one basecoat layer before applying a clearcoat composition. The number of basecoat layers usually depends on the color standard that is being targeted and the application process that is available at coating facility. However, it is possible and preferred to apply only one basecoat composition to form one basecoat layer.

Drying is followed by the application of clearcoat composition 1 and 2 or only clearcoat composition 2 according to the process of the invention.

Clearcoat Compositions 1

Clearcoat composition 1 which is only used in alternative step iii.(a) of the process according to the present invention can be any conventional solvent-borne two-pack clearcoat composition apt to cure at a temperature of 80° C. or above, as for example a temperature up to 160° C., preferably up to 140° C. However, it is also possible to use clearcoat compositions which cure below 80° C. Therefore, either a two pack or a one-pack clearcoat can be used. Two-pack clearcoats are preferred due to their outstanding flow and levelling.

A "two-pack coating composition"—as defined in the textbook "Römpp Lexikon Lacke and Druckfarben", Thieme, 1998—is a composition were curing is affected by mixing two components (a master batch "Stammlack" and a curing agent "Härter") in a specified mixing ratio. The components themselves are not coating compositions, since they are not apt to film formation or do not form durable films. This definition is valid for all two-pack coating compositions as described herein, irrespective of whether it is a primer composition, basecoat composition or clearcoat composition.

Preferably, the clearcoat composition 1 is a two-pack clearcoat composition, which comprises one or more polymeric polyols in the master batch and one or more isocyanato-group containing species in the curing agent.

A suitable two-pack clearcoat composition 1 is for example EverGloss® 905 (master batch) with SC290109 as a curing agent, both being commercially available from BASF Coatings GmbH.

To produce a ready-to-use two-pack clearcoat composition 1 the master batch containing the polymeric polyol and the curing agent containing the isocyanate-group containing species are mixed.

Most preferred polymeric polyols are poly(meth)acrylate polyols.

The poly(meth)acrylate polyols that are particularly preferred are generally copolymers formed from hydroxyl-functional (meth)acrylates and non-hydroxy-functional monomers, particularly preferred non-hydroxy-functional (meth)acrylates. Examples for such poly(meth)acrylate polyols and the monomers used to produce such poly(meth)acrylate polyols are usually the same as described for clearcoat compositions 2, even though clearcoat compositions 1 and 2 preferably differ from each other. The same applies for the isocyanato-group containing species as described below for clearcoat compositions 2. However the isocyanato-group containing species as used in clearcoat compositions 1 usually differ from those in clearcoat compositions 2 in that they are preferably free from silane group containing species.

The mixing ratio depends on the hydroxyl group content of the species in the master batch and the isocyanate group content of the species in the curing agent.

If a first clearcoat composition 1 is used, it is desirable that the second clearcoat layer adheres readily to the first clearcoat layer without sanding of the first clearcoat. To this end, the hydroxyl group content of the species in the master batch in equivalents is to be higher than the isocyanate group content of the isocyanate-group containing species in the curing agent in equivalents, i.e. per one isocyanate group in the curing agent, more than one hydroxyl group in the master batch has to be present. Accordingly, the mixing ratio of the master batch with the curing agent to produce the two-pack clearcoat composition 1 as used in the process of the present invention can best be expressed by the OH-to-NCO ratio, i.e. mol(OH) to mol(NCO), of both components. Preferably the OH to NCO ratio (in mol) is from 1:0.65 to 1:0.98, more preferred 1:0.70 to 1:0.95, even more preferred 1:0.75 to 1:0.90 and most preferred 1:0.80 to 1:90, as for example 1:0.85.

If the molar ratio of OH to NCO is less than 1:0.65 the adhesion of the clearcoat layer to the subjacent layers deteriorates. In case the molar ratio of OH to NCO is 1:1 or even 1:>1 unreacted NCO groups may remain in the coating, leading to undesired reaction sites at the surface of the coating.

It is also possible to achieve a good adhesion to subsequent layers by formulating the mixing ratio to leave excess NCO groups after curing of clearcoat layer 1. However, in this case the residual NCO groups can be lost to reaction to atmospheric moisture, if the parts are stored for extended periods. Such storage would occur if there is a weekend or holiday between the application of clearcoat composition 1 and clearcoat composition 2. Residual OH groups are stable to such extended times between the first and second clearcoat application.

Clearcoat Compositions 2

Clearcoat composition 2 is apt to be cured at low temperature, i.e. a temperature of more than 25° C. to below 60° C., preferably a temperature in the range from 30 to 55° C., more preferred at a temperature from 35 to 55° C. Most preferred the clearcoat compositions are apt to be cured at a temperature of 38 to 52° C. or 40 to 50° C.

Clearcoat composition 2 is preferably a solvent-borne clearcoat composition, preferably comprising aprotic organic solvents. Solvents suitable for the clearcoat composition 2 are particularly those, which are chemically inert towards the ingredients of the clearcoat composition and particularly do not react with the other ingredients when the coating composition is being cured. Examples of such solvents are aliphatic and/or aromatic hydrocarbons such as toluene, xylene, solvent naphtha, Solvesso 100 or Hydrosol® (obtainable from ARAL), parachlorobenzotrifluoride, ketones, such as acetone, methyl ethyl ketone, methyl propyl ketone or methyl amyl ketone, esters, such as ethyl acetate, butyl acetate, pentyl acetate or ethyl 3-ethoxypropionate, ethers, or mixtures of the afore-mentioned solvents. The aprotic solvents or solvent mixtures preferably have a water content of not more than 1%), more preferably not more than 0.5%, by weight, based on the solvent.

Most preferably, clearcoat composition 2 is a solvent-borne two-pack clearcoat composition.

As clearcoat composition 2, a two-pack clearcoat composition is particularly preferred, which comprises one or more polymeric polyols in the master batch and one or more isocyanato-group containing species in the curing agent.

Polymeric Polyols

Most preferred polymeric polyols are poly(meth)acrylate polyols.

The poly(meth)acrylate polyols that are particularly preferred are generally copolymers formed from hydroxyl-functional (meth)acrylates and non-hydroxy-functional monomers, particularly preferred non-hydroxy-functional (meth)acrylates.

Hydroxyl-containing monomer units used are preferably hydroxyalkyl acrylates and/or hydroxyalkyl methacrylates, such as in particular 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate and particularly 4-hydroxybutyl acrylate and/or 4-hydroxybutyl methacrylate.

Further monomer units used for the polyacrylate polyols are preferably alkyl methacrylates and/or alkyl methacrylates, such as, preferably, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate, or, in particular, cyclohexyl acrylate and/or cyclohexyl methacrylate.

Further monomer units which can be used for the polyacrylate polyols are vinylaromatic hydrocarbons, such as vinyltoluene, alpha-methylstyrene or particularly styrene, amides or nitriles of acrylic or methacrylic acid, vinyl esters or vinyl ethers, and, in minor amounts and particularly acrylic and/or methacrylic acid.

The poly(meth)acrylate polyols preferably have weight-average molecular weights $M_w$ of from 1,000 to 20,000 g/mol and particularly from 1,500 to 10,000 g/mol, in each case measured by means of gel permeation chromatography (GPC). To determine polymer molecular weights by GPC, fully dissolved molecules of a polymer sample are fractionated on a porous column stationary phase. A 0.1 mol/l acetic acid solution in tetrahydrofuran (THF) is used as the eluent solvent. The stationary phase is combination of Waters Styragel HR 5, HR 4, HR 3, and HR 2 columns. Five milligrams of sample are added to 1.5 mL of eluent solvent and filtered through a 0.5 μm filter. After filtering, 100 μl of the polymer sample solution is injected into the column at a flow rate of 1.0 mL/min. Separation takes place according to the size of the polymer coils which form in the eluent solvent. Small molecules diffuse into the pores of the column material more frequently and are therefore retarded more than large molecules. Thus, large molecules are eluted earlier than small molecules. The molecular weight distribution, the number-average $M_n$ and weight-average $M_w$ and the polydispersity $M_w/M_n$ of the polymer samples are calculated with the aid of chromatography software utilizing a calibration curve generated with the EasyValid validation kit which includes a series of unbranched-polystyrene standards of varied molecular weights available from Polymer Standards Service.

The theoretical glass transition temperature ($T_g$) of the poly(meth)acrylate polyols is preferably from −100° C. to 100° C., particularly preferred from −50° C. to 80° C., using the Flory Fox equation. The $T_g$ values of copolymers are calculated from the $T_g$ values of the homopolymers of the comonomers contained therein using the Flory Fox equation.

The homopolymer $T_g$ values are obtained from the Polymer Handbook, Third Edition, J. Brandup, I. H. Immergut, Chapter VI, pp. 215-225. The Flory Fox equation is based on the weight fraction of each comonomer and the $T_g$ of its corresponding homopolymer as follows:

$$Tg \text{ of copolymer } [K°] = \left[ \sum_{i \text{ comonomers}} \frac{w_i}{Tg_i} \right]^{-1}$$

$w_i$ = weight fraction of monomer $i$ $Tg_i$ = homopolymer $Tg$ of monomer $i$ $[K°]$ The poly(meth)acrylate polyols preferably have a hydroxyl number from 60 to 250 mg KOH/g, more preferred from 70 and 200 KOH/g, and an acid number of between 0 and 30 mg KOH/g.

The hydroxyl number indicates the number of mg of potassium hydroxide that is equivalent to the amount of acetic acid bound by 1 g of the polymeric polyols, preferably the poly(meth)acrylatepolyols on acetylation. For the determination, the sample is boiled with acetic anhydride-pyridine and the resultant acid is titrated with potassium hydroxide solution (DIN EN ISO 4629-2:2016-12).

The acid number here indicates the number of mg of potassium hydroxide that is consumed in neutralizing 1 g of the polymeric polyols, preferably the poly(meth)acrylatepolyols (DIN EN ISO 2114:2002-06).

Isocyanato-Group Containing Species

The isocyanate-group containing species serves as crosslinker in the curing agent used as a component in the two-pack clear coat composition used in the process of the present invention.

Per definition an "isocyanato-group containing species" must contain at least one isocyanato-group per species i.e. the species needs to contain at least one free, i.e. unblocked NCO group.

However, if only one isocyanato-group is contained in the isocyanato-group containing species, the species must contain at least one further reactive group which can participate in curing, preferably in cross-linking the polymeric polyol or by self-cross-linking. Such further reactive groups are preferably one or more hydrolysable silane groups, such as hydrolysable mono-silyl groups and/or hydrolysable bis-silyl groups. Hydrolysable silane groups can undergo hydrolytic condensation reactions by formation of Si—O—Si bonds.

The isocyanato-group containing species contains preferably two isocyanato groups (diisocyanate) or even more preferred more than two isocyanate groups (polyisocyanate), particularly preferred three or more isocyanate groups.

Suitable diisocyanates are for example substituted or unsubstituted aromatic, aliphatic, cycloaliphatic and/or heterocyclic diisocyanates. Examples of preferred diisocyanates are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates. Amongst the afore-mentioned diisocyanates the aliphatic and/or cycloaliphatic diisocyanates are most preferred, such as hexamethylene 1,6-diisocyanate, isophorone diisocyanate, and 4,4'-methylenedicyclohexyl diisocyanate. Additionally, preferred diisocyanates are the biuret dimers and uretdion dimers of the afore-mentioned diisocyanates.

Particularly suitable polyisocyanates are trimers of diisocyanates, particularly the trimers of the afore-mentioned diisocyanates. Most preferred trimers of diisocyanates are isocyanurate trimers and iminooxadiazindion trimers, amongst which isocyanurate trimers are even more preferred. Most preference is given to isocyanurate trimers of aliphatic and/or cycloaliphatic diisocyanates, such as isocyanurate trimers of hexamethylene 1,6-diisocyanate, isophorone diisocyanate and/or 4,4'-methylenedicyclohexyl diisocyanate.

In case of the use of diisocyanates one of the two free isocyanato groups can be reacted with a mono-silane of formula (I)

$$HX—R^1—Si(OR^z)_z(R^y)_{3-z} \quad (I);$$

or a bis-silane of formula (II)

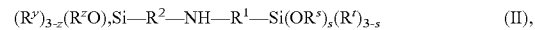

$$(R^y)_{3-z}(R^zO)_zSi—R^2—NH—R^1—Si(OR^s)_s(R^t)_{3-s} \quad (II),$$

wherein in formulas (I) and (II)

X=O or NR, wherein R=H or a linear or branched alkyl group with 1 to 20 carbon atoms, a cycloalkylgroup with 3 to 10 carbon atoms, an arylgroup with 6 to 20 carbon atoms or an aralkylgroup with 7 to 20 carbon atoms, or an aliphatic hydrocarbon radical which is interrupted by nonadjacent oxygen, sulfur or tertiary amino groups;

$R^1$ and $R^2$ are independently from each other linear or branched alkylene or cycloalkylene radicals having 1 to 20 carbon atoms;

$R^y$ and $R^t$ are independently from each other linear or branched alkyl groups with 1 to 20 carbon atoms, cycloalkyl groups with 3 to 10 carbon atoms, aryl groups with 6 to 20 carbon atoms or aralkyl groups with 7 to 20 carbon atoms, or aliphatic hydrocarbon radicals which are interrupted by nonadjacent oxygen, sulfur or tertiary amino groups;

$R^s$ and $R^z$ are independently from each other linear or branched alkyl groups with 1 to 4 carbon atoms or acetyl groups; and z and s are independently from each other 1 to 3.

Preferably, in formulas (I) and (II)

X=NH;

R and $R^z$ are independently from each other linear or branched alkylene or radicals having 2 to 8, more preferred 3 to 6 and most preferred 3 carbon atoms;

$R^y$ and $R^t$ are independently from each other linear or branched alkyl groups having 1 to 4 carbon atom, more preferred methyl or ethyl;

$R^s$ and $R^z$ are independently from each other linear or branched alkyl groups with 1 to 4 carbon atoms, more preferred methyl or ethyl, most preferred methyl; and z and s are independently from each other 2 or 3, most preferred 3.

Preferred mono-silanes of formula (I) are 2-aminoethyltrimethoxysilane, 2-aminoethyltriethoxsilane, 3-aminopropyltrimethoxysilane, 3-aminopropyltriethoxysilane, 4-aminobutyltrimethoxysilane, 4-aminobutyltriethoxysilane, 2-hydroxyethyltrimethoxysilane, 2-hydroxyethyltriethoxysilane, 3-hydroxypropyltrimethoxysilane, 3-hydroxypropyltriethoxysilane, 4-hydroxybutyltrimethoxysilane, and 4-hydroxybutyltriethoxysilane. Particularly preferred mono-silanes of formula (I) are N-(2-(trimethoxysilyl) ethyl) alkylamines, N-(3-(trimethoxysilyl) propyl)-alkylamines, N-(4-(trimethoxysilyl)butyl) alkylamines, N-(2-(triethoxysilyl) ethyl) alkylamines, N-(3-(triethoxysilyl) propyl) alkylamines and/or N-(4-(triethoxysilyl) butyl) alkylamines. N-(3-(trimethoxysilyl) propyl) butylamine is especially preferred. Aminosilanes of this kind are available for example under the brand name DYNASYLAN® from DEGUSSA or Silquest® from OSI.

Particularly preferred compounds (II) are bis(2-ethyltrimethoxy-silyl) amine, bis(3-propyltrimethoxysilyl) amine, bis(4-butyltrimethoxy-silyl) amine, bis(2-ethyltriethoxysilyl) amine, bis(3-propyltriethoxy-silyl) amine and/or bis(4-butyltriethoxysilyl) amine, bis(3-propyltrimethoxy-silyl) amine is especially preferred. Aminosilanes of this kind are available for example under the brand name DYNASYLAN® from DEGUSSA or Silquest® from OSI.

When using the particularly suitable trimers of diisocyanates, particularly the trimers of the afore-mentioned diisocyanates, it is possible to react up to two of the isocyanate groups with mono-silanes of formula (I) and/or bis-silanes of formula (II) to have at least one, preferably two remaining NCO group at a species. It is also possible and highly preferred to use mixtures of the afore-mentioned species.

In a particularly preferred embodiment the isocyanate-group containing species can be obtained by reacting isocyanurate trimers of aliphatic and/or cycloaliphatic diisocyanates most preferred hexamethylene diisocyanate and/or isophorondiisocyanate with a substoichiometric mixture of one or more mono-silanes of formula (I) and/or one or more bis-silanes of formula (II) to obtain a mixture, comprising isocyanurate species having one, two or all isocyanate groups left and possibly species were all isocyanate groups of the isocyanurate trimer are reacted with the one or more mono-silanes of formula (I) and/or one or more bis-silanes of formula (II).

Further Ingredients of Clearcoat Composition 2

The solvent-borne two-pack clearcoat composition 2 preferably contains catalysts for crosslinking the hydroxyl groups of the polymeric polyol and the free isocyanate groups of the isocyanate-group containing species.

Examples for such catalysts are Lewis acids (electron-deficient compounds), such as tin naphthenate, tin benzoate, tin octoate, tin butyrate, dibutyltin dilaurate, dibutyltin diacetate, dibutyltin oxide, and lead octoate, for example, and also catalysts as described in WO-A-2006/042585. Catalysts used with preference for the crosslinking of the hydrolysable silyl groups, if present, are amine adducts of phosphoric acid or of sulfonic acid (e.g., Nacure® products from King Industries).

If isocyanate-group containing species are used which also contain silyl groups as present in formulae (I) and (II), preferably use is made of catalysts from the group consisting of phosphorus-containing catalysts, more particularly of phosphorus- and nitrogen-containing catalysts. In this context, it is also possible to use mixtures of two or more different catalysts. Examples of suitable phosphorus-containing catalysts are substituted phosphonic diesters and diphosphonic diesters, preferably from the group consisting of acyclic phosphonic diesters, cyclic phosphonic diesters, acyclic diphosphonic diesters, and cyclic diphosphonic diesters. Catalysts of this kind are described for example in the German patent application publication document DE-A-102005045228. Use is made more particularly of the corresponding amine-blocked phosphoric esters, and preferably of amine-blocked phosphoric acid ethylhexyl esters and amine-blocked phosphoric acid phenyl esters, with very particular preference amine-blocked bis(2-ethylhexyl) phosphate.

The catalysts are used preferably in fractions of 0.01% to 20%, more preferably in fractions of 0.1% to 10%, by weight, based on the nonvolatile constituents of the clearcoat composition 2. A lower activity of the catalyst can be, in this case, partially compensated by correspondingly higher amounts in use.

Examples of suitable coatings additives are UV absorbers, light stabilizers such as HALS compounds, benzotriazoles or oxalanilides; free-radical scavengers; slip additives; polymerization inhibitors; defoamers; wetting agents such as siloxanes, fluorine compounds, carboxylic monoesters, phosphoric esters, polyacrylic acids and their copolymers, or polyurethanes; adhesion promoters such as tricyclodecanedimethanol; flow control agents; film-forming assistants such as cellulose derivatives; rheology control additives; and/or flame retardants.

Mixing Ratio

To produce the ready-to-use two-pack clearcoat composition 2 the master batch containing the polymeric polyol and the curing agent containing the isocyanate-group containing species are mixed.

The mixing ratio depends on the hydroxyl group content of the species in the master batch and the isocyanate group content of the species in the curing agent.

Particularly in view of interlayer adhesion, it is generally preferred that either one of the clearcoat compositions 1 and 2 has a molar OH-to-NCO ratio being 1.0 or greater, while the other clearcoat composition has a molar OH-to-NCO ratio being 1.0 or less.

If clearcoat composition 1 is formulated to contain excess OH groups as described above, it is desirable to have a higher level of NCO groups in clearcoat composition 2 to compliment these and to provide for interlayer adhesion without the need of mechanically roughening cured clearcoat layer 1. For example, a molar OH-to-NCO ratio not greater than 1.0 to 0.9, would be preferred in such case.

An additional factor to be considered particularly for the clearcoat layer 2 is the loss of NCO groups to reactions with moisture in the air. Such reactions are more prevalent at lower curing temperatures, such as curing temperatures below 60° C., as for example 40 to 50° C. or even lower as e.g. 23° C. of 30° C. It is estimated that about 10 to 20% by weight of the NCO groups can be lost to reactions with moisture in the air at a curing temperature from 40 to 50° C.

Considering both of these factors, it can be desirable to have an excess of NCO in the clearcoat composition 2. For example, a molar OH-to-NCO ratio in the range from 1.0 to 1.3. More preferably, the molar ratio of OH-to-NCO in clearcoat composition 2 is in the range from 1.0 to 1.2.

On the other hand, If clearcoat composition 1 contains an excess of NCO groups, then it is preferred that clearcoat composition 2 contains an excess of OH groups. However, this is less desirable from the viewpoint of practicability in case of process delays after applying clearcoat 1, as described earlier. If there are process delays, some of the excessive NCO groups present in clearcoat layer 1 may have reacted with moisture from the air. Nevertheless, as shown in the example section of the present invention, a combination of clearcoat compositions 1 and 2, where clearcoat composition 1 contains a molar excess of NCO groups over OH groups, while clearcoat composition 2 contains a molar excess of OH groups over NCO groups, also leads to an acceptable interlayer adhesion.

Application Conditions of Coating Compositions

The coating compositions (primer composition, basecoat composition and clearcoat compositions 1 and 2) as used in the process according to the invention can be applied by any of the typical application methods, such as spraying, knife coating, spreading, pouring, dipping, impregnating, trickling or rolling, for example. During such application, the substrate to be coated may itself be at rest, with the application equipment or unit being moved. Alternatively, the substrate to be coated, in particular a coil, may be moved, with the application unit at rest relative to the substrate or being moved appropriately.

Preference is given to employing spray application methods, such as conventional air-gun spraying, compressed-air spraying such as high volume low pressure or low volume low pressure spraying, airless spraying and electrostatic spray application (ESTA), for example. For each layer the coating composition can be sprayed in a single spray pass or multiple spray passes. Thus, a single layer is formed by one or more spray passes.

The terms "drying" or "flashing off" mean that at least some of the solvents and/or water evaporated from the coating layer formed, before the next coating composition is applied and/or the next curing is carried out.

Typically, the solvent-borne coating composition layers such as the preferred primer composition layer and the preferred clear coat composition layers 1 and 2 are dried at ambient temperature, preferably room temperature (23° C.) before the next coating composition is applied and/or curing is carried out. The preferably water-borne basecoat layer is typically flashed at elevated temperature.

Preferred drying times for the primer layer formed in step i. of the process of the present invention are from 1 to 15 min, more preferred from 2 to 10 min and most preferred from 3 to 5 min. Preferred drying temperature ranges for the primer layer formed in step i. are from 18 to 28° C., more preferred from 20 to 25° C. and most preferred from 22 to 23° C.

It is however possible to not only dry the thus obtained primer layer, but to already partially or fully cure the primer layer, subsequently to drying the primer layer and before applying the basecoat composition. Preferred curing times for the primer layer formed in step i. of the process of the present invention are from 10 to 40 min, more preferred from 15 to 30 min and most preferred from 20 to 25 min. Preferred curing temperature ranges for the primer layer formed in step i. are from 70 to 120° C., more preferred from 80 to 100° C. and most preferred from 85 to 90° C.

Preferred drying times for the water-borne basecoat layer formed in step ii. of the process of the present invention are from 1 to 30 min, more preferred from 2 to 15 min and most preferred from 4 to 10 min. Preferred drying temperature ranges for the basecoat layer formed in step ii. are from 30 to below 80° C., more preferred from 40 to 70° C. and most preferred from 50 to 60° C.

Preferred drying times for the solvent-borne basecoat layer formed in step ii. of the process of the present invention are from 2 to 20 min, more preferred from 3 to 15 min and most preferred from 5 to 10 min. Preferred drying temperature ranges for the primer layer formed in step i. are from 18 to 28° C., more preferred from 20 to 25° C. and most preferred from 22 to 23° C.

Preferred drying times for the clearcoat layer 1 formed in step iii.(a) of the process of the present invention are from 5 to 20 min, more preferred from 7 to 15 min and most preferred from 8 to 12 min. Preferred drying temperature ranges for the primer layer formed in step i. are from 18 to 28° C., more preferred from 20 to 25° C. and most preferred from 22 to 23° C.

If alternative A, i.e. step iii.(a) is carried out in the process according to the invention, the layers formed in steps i., ii. and the first clearcoat layer 1 are first cured at a temperature of at least 80° C., preferably at a temperature in the range from 80 to 150° C., more preferred in the range of 80 to 140° C. and most preferred in the range of 80 to 90° C. The curing time for the layers formed in steps i., ii and the first clearcoat layer 1 are preferably in the range from 10 to 40 min, more preferred from 15 to 35 min and most preferred in the range from 20 to 30 min.

After curing the layers formed in steps i., ii. and the first clearcoat layer 1 at a temperature of at least 80° C., the coated substrate is preferably cooled to a temperature in the range from room temperature (i.e. 23° C.) to a temperature of or below 60° C., before applying the clearcoat composition 2.

All the herein indicated times and temperatures for curing are given in terms of the actual temperature of the coated and to be cured fiber-reinforced composite material (i.e. the "part temperature"). The times to elevate the temperature of the part to a temperature where curing is performed (i.e. the "ramp-up time") is not considered as "curing time".

All the herein indicated times and temperatures for drying/flash-off are given in terms of the temperature surrounding the coated part. The drying time is the time, including any "ramp-up drying times" to the drying temperature.

Subsequently, in step iii.(a) a second clearcoat composition, i.e. clearcoat composition 2 is applied onto the thus cured layers to form a clearcoat layer 2.

In step iii.(a) of the process of the present invention, clearcoat layer 2 is first cured at a temperature of more than 25° C. to less than 60° C., preferably at a temperature in the range from 30 to 55° C., more preferred at a temperature from 35 to 55° C. and most preferred the clearcoat composition 2 is cured at a temperature in the range from 38 to 52° C. or 40 to 50° C. The curing time for clearcoat layer 2 is in the range from 10 to 40 min, preferably from 15 to 35 min and most preferred in the range from 20 to 30 min.

This first cure of clearcoat layer 2 in step iii.(a) is optionally followed by a second cure at a temperature of at least 80° C., preferably at a temperature in the range from 80 to 150° C., more preferred in the range of 80 to 140° C. and most preferred in the range of 80 to 90° C. The curing time for the second curing of clearcoat layer 2 is preferably in the range from 10 to 40 min, more preferred from 15 to 35 min and most preferred in the range from 20 to 30 min, thus forming the multilayer coating according to alternative A. In case such optional second cure is carried out, the coated substrate is preferably cooled to a temperature in the range from room temperature (i.e. 23° C.) to a temperature below the curing temperature of the first cure, before carrying out the second cure.

If alternative B, i.e. step iii.(b) is carried out in the process according to the invention, no first clearcoat composition 1 is applied. Instead, clearcoat composition 2 is applied as the first clearcoat composition 2 directly onto the basecoat layer to form a single clearcoat layer 2.

In step iii.(b) the single clearcoat layer 2 is first cured at a temperature of more than 25° C. to less than 60° C., preferably at a temperature in the range from 30 to 55° C., more preferred at a temperature from 35 to 55° C. and most preferred the clearcoat composition 2 is cured at a temperature in the range from 38 to 52° C. or 40 to 50° C. The curing time for clearcoat layer 2 at this low temperature is in the range from 10 to 40 min, preferably from 15 to 35 min and most preferred in the range from 20 to 30 min.

This first cure of clearcoat layer 2 in step iii.(b) is followed by a second cure at a temperature of at least 80° C., preferably at a temperature in the range from 80 to 150° C., more preferred in the range of 80 to 140° C. and most preferred in the range of 80 to 90° C., as in alternative A. The curing time for the second curing of clearcoat layer 2 is again preferably in the range from 10 to 40 min, more preferred from 15 to 35 min and most preferred in the range from 20 to 30 min, thus forming the multilayer coating according to alternative B, in the same manner as in alternative A.

It was found that alternative A of the process according to the invention, which makes use of the formation of an intermediate clearcoat layer 1, cured at a temperature of 80° C. or above, followed by a second clearcoat layer 2, cured in two steps, first at lower temperature in the range from 25 to below 60° C. and subsequently at a temperature above 80° C., each curing step carried out for 10 to 40 min, led to an even enhanced appearance compared to alternative B, making use of the formation of a single clearcoat layer, only.

One of the advantages of the present invention is that there is preferably no mechanical roughening step such as a sanding step required after curing clearcoat layer 1 in step iii.(a), more preferable no mechanical roughening step such as a sanding step is required in or after any step of the process.

Fiber-Reinforced Composite Material Coated with a Multilayer Coating

A further subject of the present invention is a fiber-reinforced composite material coated with multilayer coating obtainable according to the process of the present invention. Since the fiber-reinforced composite material coated with multilayer coatings according to the process of the present invention obviously differ in adhesion and appearance compared to prior art, the fiber-reinforced composite material coated with such multilayer coatings differ from prior art. However, it is not possible to better describe the differences than by referring to the process for producing such fiber-reinforced composite material coated with a multilayer coating as described above.

In the following the invention is described referring to working examples.

EXAMPLES

Example Preparation of a Multilayer Moating Comprising only One Clearcoat Layer

A carbon fiber reinforced polyamide material containing 20% by weight of short carbon fibers produced by injection molding was used as a fiber-reinforced composite material (Ultramid® XA3418 obtainable from BASF PM Group)

This substrate was spray coated with a one-pack solvent-borne primer composition (AdPro U04AM062M; obtainable from BASF Corporation, Coatings Division, 26701 Telegraph Rd. Southfield, Mich. 48033; containing, based on the total weight of the primer composition 14.6% by weight of polymeric polyols in form of a (poly(meth)acrylate polyol and polyester polyol mixture; 1.7% by weight of HMMM, 1.5% by weight of a chlorinated polyolefin modified with maleic acid, 0.2% by weight of an amine neutralized p-toluene sulfonic acid catalyst, 9.1% by weight of pigments and fillers; and an organic solvent mixture comprising aromatic solvents and ketones). The dry film thickness of the primer layer was about 12.5±2.5 µm. The primer layer was flashed off at room temperature (i.e. 23° C.).

Subsequently a black water-borne one-pack basecoat composition (E211KU015 BASF Corporation, Coatings Division, 26701 Telegraph Rd. Southfield, Mich. 48033; containing based on the total weight of the composition a mixture of polyurethane polyols (31.7% by weight of Example B of U.S. Pat. No. 6,001,915), polyurethane-acrylic polyol (2.5% by weight of Example D of U.S. Pat. No. 6,001,915); a polyesterpolyol (2.2% by weight of Example A of U.S. Pat. No. 6,001,915) and 0.4% by weight of a polyetherpolyoldiol; 5.9% by weight of an imino-type methylated melamine-formaldehyde resin; black and yellow pigment dispersions; 6.4% by weight of butoxyethanol; 1% by weight of Shell Sol OMS; thickeners, defoamers, amino-type pH adjusters; and water as the main volatile ingredient) was spray-applied to onto the primer layer followed by a 6-minute flash off at 60° C. The dry film thickness of the base coat layer was 12.5±2.5 µm.

Subsequently a two-pack solvent-borne Clearcoat Composition A (i.e. iGloss® FF81-0485 as Master Batch mixed 2:1 with SC81-0905 Curing Agent, obtainable from BASF Coatings GmbH, see Clearcoat Composition A) was applied by spray coating.

Clearcoat Composition A (in % by Weight on Total Weight of the Master Batch and Curing Agent, Respectively):

Master Batch:
26.3% by weight of poly(meth)acrylic polyol I (65% by weight of solids; OH value 175 mg KOH/g; $T_g$ (calc.) −31° C.); 13.9% by weight of poly(meth)acrylic polyol II (60% by weight of solids; OH value 156 mg KOH/g; $T_g$ (calc.) 26° C.); 14.1% by weight of poly(meth)acrylic polyol III (67.5% by weight of solids; OH value 182 mg KOH/g; $T_g$ (calc.) 26° C.); 20.5% by weight of butyl acetate; 17.4% by weight of Aromatic 100; 2.3% by weight of a UV absorber; 1.0% by weight of a light stabilizer; 0.05% by weight of wetting agent; 0.03% by weight of a defoamer; 2.2% by weight of an amine neutralized phosphate catalyst; 0.2% by weight of organo bismuth catalyst; 1.0% by weight of di-2-ethylhexyl acid phosphate)

Curing Agent:
80% by weight of aliphatic HDI-Trimer wherein a part of the NCO groups was modified by reaction with a mixture of a monosilyl-aminosilane (Dynasylan® 1189) and a bissilylaminosilane (Dynasylan® 1124) (both silanes being obtainable from Evonik); 20% by weight butyl acetate Determination of the Appearance of the Multilayer Coating of Example 1

TABLE 1

| | Clear Coat Appearance (CC appearance) | |
|---|---|---|
| Baking Conditions | Long Wave (LW) | Short Wave (SW) |
| (1) 25 min × 80° C. | 21 | 53 |
| (1) 25 min × 50° C. | 12 | 37 |
| (2) 25 min × 80° C. | | |

Curing the single clearcoat layer at a temperature of 80° C. for 25 min leads to an insufficient leveling indicated by the high long wave and short wave values determined with a BYK Wavescan® apparatus. The double curing procedure, low curing temperature at 50° C. for 25 min followed by higher curing temperature at 80° C. for 25 min, lead to a significantly improved appearance characterized by much lower values for the long wave and short wave measurement.

Example—2 Preparation of a Multilayer Coating Comprising Clearcoat Layer 1 and Clearcoat Layer 2

A carbon fiber reinforced polyamide material containing 20% by weight of short carbon fibers produced by injection molding was used as a fiber-reinforced composite material (Ultramid® XA3418 obtainable from BASF PM Group).

This substrate was spray coated with a primer composition (AdPro U04AM062M; obtainable from BASF Corporation, Coatings Division, 26701 Telegraph Rd. Southfield, Mich. 48033). The dry film thickness of the primer layer was about 7±1 µm. The primer layer was flashed off at room temperature (i.e. 23° C.). Subsequently a black water-borne basecoat composition (E211KU015) was spray-applied to onto the primer layer followed by a 6-minute flash off at 60° C. The dry film thickness of the base coat layer was about 16 µm.

Subsequently a two-pack solvent-borne clearcoat composition 1 consisting of EverGloss® 905 JF71-0312 Mixed 3.5:1 by weight with SC29-0109, obtainable from BASF Coating GmbH, was applied by spray coating (see Clearcoat Composition 1, below). The dry film thickness was about 52 µm. Primer layer, basecoat layer and clearcoat layer were baked at 80° C. for 25 min. The thus baked multilayer coating was cooled to room temperature.

Clearcoat Composition 1 (in % by Weight on Total Weight of the Master Batch and Curing Agent, Respectively):
Master Batch:
38.9% by weight of poly(meth)acrylic polyol IV (60% by weight of solids; OH value 151 mg KOH/g; $T_g$ (calc.) 69° C.); 9.0% A by weight of poly(meth)acrylic polyol V (67% A by weight of solids; OH value 130 mg KOH/g; $T_g$ (calc.) −70° C.); 15.8% by weight of poly(meth)acrylic polyol VI (59% by weight of solids; OH value 104 mg KOH/g; $T_g$ (calc.) 4° C.); 9.4% by weight of Aromatic 100; 6.4% by weight xylene; 8.5% by weight of butyl acetate; 7.1% A) by weight of ethylene glycol butyl ether acetate; 1.0% by weight dipropylene glycol monobutyl ether acetate; 2.3% by weight of a UV absorber; 0.8% by weight of a light stabilizer; 0.16% by weight of leveling and defoaming agent; 0.1% by weight of conductivity additive for spray application; 0.08% by weight of catalyst; 0.5% by weight of benzoic acid
Curing Agent:
67.5% by weight of aliphatic HDI-Trimer; 16.25% by weight of butyl acetate; 16.25% by weight of Solvent Naphtha Subsequently some of the thus coated substrates were spray coated with two-pack solvent-borne clearcoat composition B (i.e. masterbatch DC5995 was mixed 4:1:1 with curing agent DH100 and reducer UR50 obtainable from BASF Coatings GmbH) and some other of the thus coated substrates were spray coated with two-pack clearcoat A, i.e. the same clearcoat composition as used in Example 1. The dry film thickness is about 75 µm for both clearcoat layers formed from clearcoat composition A and clearcoat composition B. The substrates thus coated were baked for 25 min each, but at different temperatures (25° C., 40° C., 50° C. and 60° C.). Afterwards the thus coated substrates were cooled 15 min to room temperature (i.e. 23° C.) and received a second bake for 25 min each at a temperature of 80° C.

Clearcoat Composition B (in % by Weight on Total Weight of the Master Batch and Curing Agent, Respectively):
Master Batch:
40.4% by weight of poly(meth)acrylic polyol VII (50% by weight of solids; OH value 146 mg KOH/g; $T_g$ (calc.) 75° C.); 16.2% by weight of poly(meth)acrylic polyol VIII (70% by weight of solids; OH value 141 mg KOH/g; $T_g$ (calc.) 94° C.); 6.1% by weight of poly(meth)acrylic polyol IX (43% by weight of solids; OH value 87 mg KOH/g; $T_g$ (calc.) 74° C.); 32.48% by weight of parachlorbenzotrifluoride (PCBTF); 2.2% by weight of ethyl 3-ethoxypropionate; 0.9% by weight of ethylene glycol butyl ether acetate; 0.7% by weight of a UV absorber; 0.5% by weight of a light stabilizer; 0.32% by weight of leveling and defoaming agent; 0.04% by weight of dibutyl tin dilaurate catalyst; 0.2% by weight of benzoic acid
Curing Agent:
55% by weight of aliphatic HDI-Trimer (NCO content: 21.8% by weight of NCO); 45% by weight of PCBTF
Reducer UR50:
62.1% by weight of n-butyl acetate; 16.0% by weight of VM&P Naphtha HT (available from Shell Chemicals); 13.0% by weight of propylene glycol mono methyl ether acetate; 5.9% by weight of HI SOL 10 (available from Jamson Labs, Inc.); 3.0% by weight ethylene glycol butyl ether acetate Determination of the Appearance of the Multilayer Coating of Example 2

TABLE 2

| CC2 type | CC2 first bake* | CC1 appearance | | CC2 appearance | |
|---|---|---|---|---|---|
| | | LW | SW | LW | SW |
| Clearcoat Composition A | 3 hrs × 25° C. | not tested | | | |
| | 25 min × 25° C. | 30 | 53 | 12 | 37 |
| | 25 min × 40° C. | 31 | 51 | 9 | 29 |
| | 25 min × 50° C. | 22 | 53 | 5 | 19 |
| | 25 min × 60° C. | 23 | 54 | 12 | 37 |
| Clearcoat Composition B | 3 hrs × 25° C. | 23 | 50 | 3 | 8 |
| | 25 min × 25° C. | 23 | 54 | 8 | 34 |
| | 25 min × 40° C. | 20 | 53 | 7 | 24 |
| | 25 min × 50° C. | 33 | 55 | 9 | 29 |
| | 25 min × 60° C. | 26 | 54 | 11 | 34 |

*for all panels a second bake was carried out for 25 min at 80° C. before the appearance of Clear Coat Composition 2 (CC2 appearance) was determined Contrary to Example 1 were a single clearcoat composition was applied, in Example 2 two clearcoat compositions were applied (first clearcoat composition CC1=EverGloss® from BASF Coatings GmbH; second clearcoat composition A=iGloss based (see above) from BASF Coatings GmbH or second clearcoat composition B=Diamont DC5995 based (see above) of BASF Coatings GmbH). The appearance results are even improved. For example, the appearance for clearcoat composition A at a 25 min at 50° C. followed by 80° C. for 25 min is for the long wave value 5 and the short wave value 19, compared to the long wave value of 12 and the short wave value of 37 found in Example 1 making use of a single clearcoat composition, only. Furthermore, it is shown that best results are achieved, if the first bake of the second clearcoat is carried out at a temperature of 40 or 50°

C., while for higher and lower temperatures, which still lead to an improvement, the improvement is less pronounced.

Example 3—Preparation of a Multilayer Coating Comprising Clearcoat Layer 1 and Clearcoat Layer 2 on Solvent-Borne and Water-Borne Basecoat Layers A carbon fiber reinforced polyamide material containing 20% by weight of short carbon fibers produced by injection molding was used as a fiber-reinforced composite material (Ultramid® XA3418 obtainable from BASF PM Group).

This substrate was spray coated with a primer composition (AdPro U04AM062M obtainable from BASF Corporation, Coatings Division, 26701 Telegraph Rd. Southfield, Mich. 48033). The dry film thickness of the primer layer was about 7±1 μm. The primer layer was flashed off at room temperature (i.e. 23° C.).

Subsequently some of the substrates were coated with a black water-borne basecoat composition (E211KU015) was spray-applied to onto the primer layer followed by a 6-minute flash off at 60° C. The dry film thickness of the base coat layer was about 16 μm.

Some other of the substrate materials were spray coated with a black high solids solvent-borne basecoat (E387KU343C BASF Corporation, Coatings Division, 26701 Telegraph Rd. Southfield, Mich. 48033) to a thickness of 15±2 μm over the primer layer and flashed at room temperature (i.e. 23° C.) for 10 minutes.

Subsequently some of the substrates were spray coated with a two-pack clearcoat composition (EverGloss® 905 JF71-0312 Mixed 3.5:1 by weight with SC29-0109 obtainable from BASF Coating GmbH). The dry film thickness was about 52 μm. Primer layer, basecoat layer and clearcoat layer were baked at 80° C. for 25 min.

Other substrates were spray coated with a two-pack clearcoat formulated for high bakes (ProGloss 2K4, E10CG081G mixed 3:1 by volume with N52CG081 available from BASF Corporation, Coatings Division, 26701 Telegraph Rd. Southfield, Mich. 48033). The dry film thickness was about 52 μm. Primer layer, basecoat layer and clearcoat layer were baked at 140° C. for 25 min. The thus baked multilayer coatings were cooled to room temperature.

Subsequently all the thus coated substrates were spray coated with two-pack clearcoat A, i.e. the same clearcoat composition as used in Example 1. The dry film thickness is about 55 μm. The substrates thus coated were baked for 25 min at 50° C. No second bake was given before reading appearance.

Determination of the Appearance of the Multilayer Coating of Example 3

TABLE 3

| basecoat type | CC1 Bake | CC1 type | After CC1 | | After CC2 (50° C.) | |
|---|---|---|---|---|---|---|
| | | | LW | SW | LW | SW |
| WB* | 25 min at 80° C. | EverGloss 905 | 12 | 53 | 5 | 22 |
| SB** | | | 12 | 54 | 5 | 21 |
| WB* | 25 min at 140° C. | ProGloss 2K4 | 21 | 61 | 5 | 19 |
| SB** | | | 17 | 60 | 4 | 19 |

*black water-borne basecoat composition (E211KU015)
**black high solids solvent-borne basecoat (E387KU343C)

The results in the first results row of Table 3 are almost identical to the results for Clearcoat Composition A, 25 min/50° C. in Table 2. The only difference is that no second bake at 80° C. for 25 min was carried out in Example 3. While the long wave value of 5 is identical, the short wave value of 19 (with second bake) is slightly better than 22 (without second bake), showing that a second bake at high is not required to solve the problems of the present invention.

Furthermore, the appearance results from Example 3 demonstrate the ability to achieve similar results for solvent-borne and water-borne basecoats. Likewise, similar results are achieved when the first clearcoat is baked at a high bake temperature.

The results clearly show that the goals of the present invention are achieved by the low temperature cure of the second clear coat composition irrespective of the type of basecoat (water-borne or solvent-borne) and the curing conditions of the first clearcoat.

The invention claimed is:

1. A process for producing a multilayer coating onto a fiber-reinforced composite material, comprising the steps of
   i. applying a primer composition onto the fiber-reinforced composite material to form a primer layer and at least partially drying the primer layer,
   ii. applying a basecoat composition onto the primer layer to form a basecoat layer and at least partially drying the basecoat layer, and
   iii. (a) applying a first clearcoat composition 1 onto the basecoat layer to form a first clearcoat layer 1 and curing the layers formed in steps i., ii. and the first clearcoat layer at a temperature of at least 80° C. and subsequently applying a second clearcoat composition 2 onto the thus cured layers to form a clearcoat layer 2 and curing clearcoat layer 2 at a temperature of more than 25° C. to less than 60° C. for 10 to 40 min; or
   (b) directly applying the clearcoat composition 2 onto the basecoat layer to form a single clearcoat layer 2 and curing the single clearcoat layer 2 at a temperature of more than 25° C. to less than 60° C. for 10 to 40 min followed by curing the primer, basecoat and clearcoat layer 2 at a temperature of at least 80° C.

2. The process according to claim 1, characterized in that the fiber-reinforced composite material comprises a polymer matrix and fibers.

3. The process according to claim 1, characterized in that the primer composition is a one-pack coating composition or a two-pack coating composition; and/or the basecoat composition is a one-pack coating compositions; and/or that clearcoat composition 1 is a one-pack coating composition or a two-pack coating composition; and/or clearcoat composition 2 is a two-pack coating compositions.

4. The process according to claim 1, characterized in that the primer composition is a solvent-borne or water-borne coating composition; the clearcoat compositions 1 and 2 are solvent-borne coating compositions; and/or the basecoat composition is a solvent-borne or water-borne coating composition.

5. The process according to claim 1, characterized in that no mechanical roughening step is required after curing clearcoat layer 1 in step iii.(a).

6. The process according to claim 5, wherein the mechanical roughening step is a sanding step.

7. The process according to claim 5, characterized in that no mechanical roughening step is required in or after any step of the process.

8. The process according to claim 7, wherein the mechanical roughening step is a sanding step.

9. The process according to claim 1, characterized in that step iii.(a) is followed by a second cure at a temperature of at least 80° C. for a time period of 10 to 40 min.

10. The process according to claim 1, characterized in that step iii.(b) subsequently to curing the single clearcoat layer 2 at a temperature of more than 25° C. to less than 60° C. for 10 to 40 min and before curing the primer, basecoat and clearcoat layer 2 at a temperature of at least 80° C., the coated fiber-reinforced composite material is cooled to a temperature in the range from 23° C. to below the curing temperature of clearcoat layer 2.

11. The process according to claim 1, characterized in that clearcoat layer 2 is cured at a temperature in the range from 30 to 55° C. for 15 to 35 min, or at a temperature in the range from 35 to 55° C. for 20 to 30 min.

12. The process according to claim 3, characterized in that the primer composition is a water-borne two-pack composition or a solvent-borne one-pack composition;
the basecoat composition is a water-borne or a solvent-borne one-pack composition; and
the clearcoat compositions 1 and 2 are solvent-borne two-pack compositions.

13. The process according to claim 1, wherein
the primer composition and the basecoat composition comprise one or more polymeric polyols and one or more aminoplast resins; and/or
the clearcoat composition 1 comprises one or more polymeric polyols and one or more isocyanato-group containing species.

14. The process according to claim 1, wherein clearcoat composition 2 comprises a master batch and a curing agent, the master batch comprising a polymeric polyol and the curing agent comprising a isocyanato-group containing species.

15. The process according to claim 14, wherein the polymeric polyol is selected from the group consisting of poly(meth)acrylate polyols and the isocyanato-group containing species is selected from the group consisting of diisocyanates and polyisocyanate.

16. The process according to claim 15, wherein the diisocyanates are selected from the group consisting of biuret dimers and uretdion dimers of diisocyanates.

17. The process according to claim 15, wherein the polyisocyanates are selected from the group consisting of trimers.

18. The process according to claim 17, wherein the trimers are selected from the group consisting of isocyanurate trimers and iminooxadiazindion trimers of diisocyanates.

19. The process according to claim 14, wherein the polymeric polyol has a weight-average molecular weight $M_w$ in the range from 1,000 to 20,000 g/mol measure by means of gel permeation chromatography and/or exhibiting a theoretical glass transition temperature in the range from −100° C. to 100° C. and/or exhibiting hydroxyl number in the range from 60 to 250 mg KOH/g; and/or wherein the one or more isocyanato-groups of the isocyanato-group containing species are reacted to introduce one or more hydrolysable silane groups into the isocyanato-group containing species.

20. A fiber-reinforced composite material coated with a multilayer coating, obtainable in a process according to claim 1.

* * * * *